Jan. 13, 1970  J. L. A. DURET  3,489,437
JOINT CONNECTION FOR PIPES
Filed May 23, 1966  3 Sheets-Sheet 1
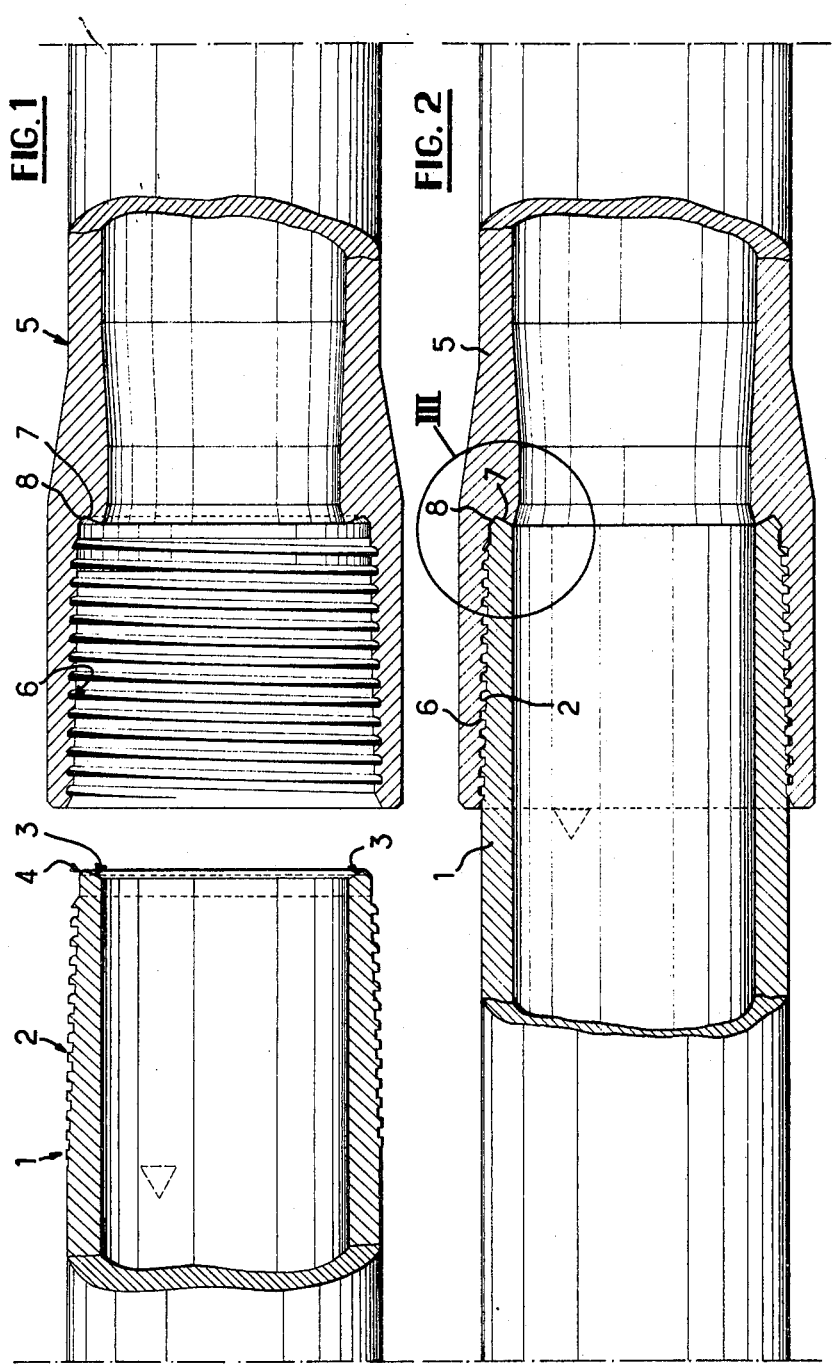
INVENTOR
JEAN LOUIS ALBERT DURET
BY "# United States Patent Office 3,489,437
Patented Jan. 13, 1970

3,489,437
JOINT CONNECTION FOR PIPES
Jean Louis Albert Duret, Aulnoye-Aymeries, France, assignor to Societe anonyme dite: Vallourec, Paris, France, a company of France
Filed May 23, 1966, Ser. No. 552,132
Claims priority, application France, Nov. 5, 1965, 37,373
Int. Cl. F16l 59/16, 55/00, 9/14
U.S. Cl. 285—55                                    12 Claims

ABSTRACT OF THE DISCLOSURE

A threaded pipe joint in which the threaded surfaces are matingly tapered, the female member being provided with an internal shoulder having a groove in its radial surface and the inner edge of the tip of the male member being beveled so that it is urged radially outward by the inside of said groove as said joint is screwed home. The joint may comprise hardened surfaces or washers.

---

Joints for the tight connection of metal pipes designed in particular for the petroleum industry are already known, in which the male extremity of one element and the female extremity of the other element are each fitted with corresponding threads on mating frusto conical surfaces in such a way that in closing the joint by screwing one element into the other locking of said threads is obtained.

The present invention concerns a novel joint which pertains to the aforementioned category and which constitutes an improvement with respect to the joints presently on the market.

The present invention has for an object to provide a joint to join two metallic pipe members in a fluid tight manner, characterized by the fact that the male member is provided with an external frustoconical threaded surface while the female member is provided with a mating external frusto-conical threaded surface and that at the completion of tightening the end of the male member which has a concave conical surface comes to seat against a convex conical surface of corresponding shape, formed at the base of the threads of the female element.

According to the invention the generatrices of these conical surfaces make an angle with a plane perpendicular to the axis of the pipe, which angle generally is between 10° and 30° and which is preferably between 15° and 20°. In any case, it is desirable that the size of this angle permit a disengageable connection in spite of the friction at the zone of abutment.

According to one preferred embodiment of the invention, the convex surface of the female element is encircled by a concave truncated cone surface against which the outer front edge of the male element can advantageously bear, even before tightening, so that a slight concave conic chamfer on said male element is slightly crushed and flattened.

In the case of pipes of larger diameter, the above-cited chamfer can assume a special importance and constitute a convex tapered bearing surface which comes to be applied very forcefully against the female element.

Due to the tapered shape of the shoulder which limits the tightness of the joint according to the invention, the male extremity of the element is in every case forced toward the outside, which assures an excellent metal-on-metal tightness, even after several assemblies of the elements of the pipes according to the invention, that is after a given female element has been assembled with different male elements, or inversely.

In this manner, due to the invention, the machining tolerances which are capable of having an adverse effect on the tightness of the joint can be used so as to have no bad effect thereon, even after repeated assemblies and disassemblies of the latter.

The inclined shoulder abutment according to the invention also has important advantages in the avoidance of excessive jamming of the joint, that is, the screwing of the male element into the female element with a force in excess of the normal tightening torque.

From the very first, due to the characteristic of the shoulder according to the invention, the extremity of the male element cannot form a flange inside the pipe line connection because the conic surface of the joint diverts this extremity toward the exterior.

Also, the conicity of the shoulder has the great advantage of counter balancing the tendency which the extremity of the male element may have to buckle inwardly, thus undergoing a so-called "en diabolo" deformation. In fact, the arrangement according to the invention tends to bring about outward buckling of the male extremity according to the arrangement called "le tonneau" (barrel), which has the effect of increasing still more the tightness of the metal-on-metal seal, along a surface on the outer periphery of the male extremity.

According to a preferred embodiment of the invention an increase of the elastic limit of the shoulder surface of the female element or of the front end surface of the male element or of both these surfaces at once, can be achieved by a treatment such as cold-hardening or heat treatment.

The result of this is that there is thus increased the maximum tightening torque which can be tolerated by the joint while permitting the metal which constitutes the extremity of the male part adjacent the part which has undergone the increase of elastic limit to deform toward the outside in order to apply the hardened part against the female element while assuring metal-on-metal tightness under very satisfactory conditions.

According to another variant, there can be placed for the same purpose as the one just indicated, a hard steel washer or ring on the shoulder of the female element.

According to another characteristic of the invention, it may be advantageous, with the purpose of increasing still more the tightness of the joint, to place a sealing ring, for example a plastic ring on the inner surface of the pipe, near the line of contact of the extremity of the male element and the shoulder of the female element.

This sealing ring can, in particular, consist of a certain thickness of plastic coating which is applied in continuity with the enamel which assures the internal protection of the pipe.

The present invention also has for an object a new method of making the threads of the joints of the type in question, which can be advantageously utilized in combination with the characteristics which have been described above.

According to this method of forming the threads, the base of the threads on the female part (that is, the end of the threads on the female part near the shoulder), have the grooves of the threads of a depth increasing progressively over a certain axial distance. Inversely, the corresponding threads at the extremity of the male part are formed so as to provide threads which increase in height progressively over the same distance.

These characteristics of the invention have several advantages.

In the first place, the progressive depth of the female threads renders more progressive the variation of the section of the female elements and reduces the cutting and grooving effect, which in turn notably increases the resistance to alternate or repeated stresses (vibratory fatigue or rotating bending fatigue).

On the other hand, this particular method of threading the ends by reason of the reduction of the bearing surface of the end threads, facilitates plastic adaptation of the male and female threads, an adaptation which is in fact always necessary, principally at the extremity of the male threads, because of thread tolerances deemed permissible during manufacture.

Finally, the substantially conic shape which is provided at the extremity of the male threading allows easier introduction and reduces the risks of having the tops of the female threads damaged by the male threads while the two elements of pipes are assembled before tightening.

With the purpose of making the invention better understood, there will now be described, purely by way of illustration and example several embodiments shown on the attached drawing.

On the drawing:

FIG. 1 shows a partial cross-section of one embodiment of a male element and a female element before assembly.

FIG. 2 is a partial cross-section of the elements represented in FIG. 1, after being assembled.

Figure 3:
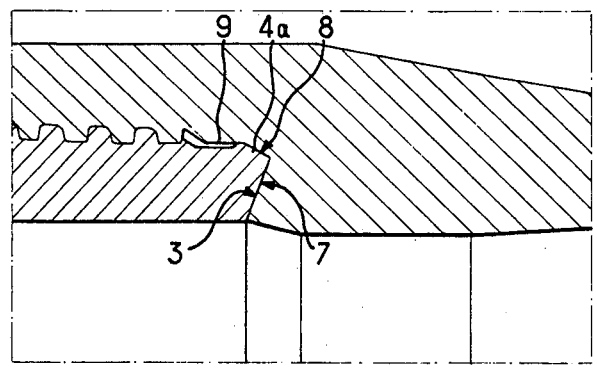
FIG. 3 is a view in larger scale of the part of FIG. 2 surrounded by a circle III.

Referring now to the drawing in detail, male element 1 is provided with a tapered threaded external surface portion 2 and an end having a convex surface 3 encircled by a chamfer 4 as seen on the drawing.

There is also shown on the drawings the female element 5 provided with an internally threaded surface portion 6 mating with the threaded portion 2 of male element 1, and a convex conical shoulder 7.

In the embodiment illustrated in the drawings, the convex conical shoulder is encircled by a concave truncated conic part 8.

Conforming to one preferred method of practicing the invention, the metal surface located at the extremity 3 of the male element and shoulder 7 of the female element have undergone a treatment such as thermal or cold-hardening treatment, in order to increase their elastic limit.

As can be seen clearly on FIG. 3, the chamfered edge 4 of the extremity of male pipe 3 is flattened against surface 8 of the female element and is thus pushed back against inner wall 9 of the female element as is shown by 4a as the two elements are screwed together.

This compressing or flattening (which is produced all the more easily as the elastic limit of the metal near the surfaces 3 and 7 has been increased) assures an excellent tightness even during successive operations of the elements constituting the joints.

It is also noted that this flattening action is greatly favored by the conical shoulder according to the invention, a shoulder which has the effect of displacing the extremity of the male element toward the exterior.

Figure 4:
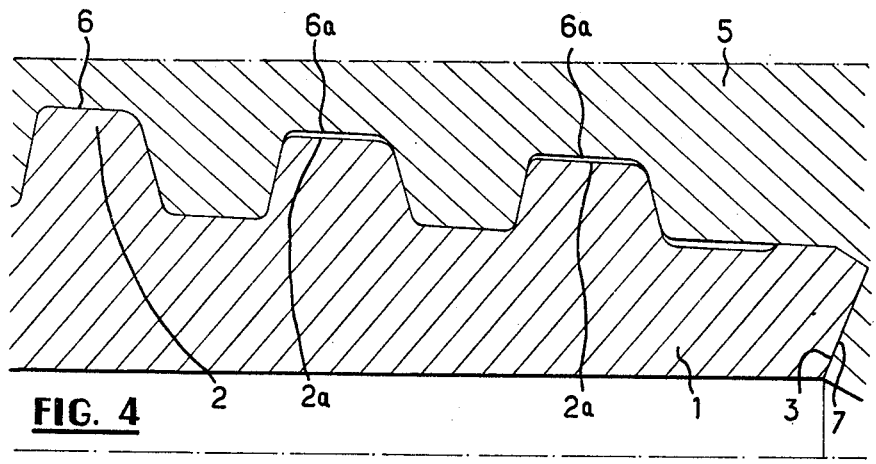
FIG. 4 is a cross-section of the part of the threads tapered according to one characteristic of the invention.

FIG. 4 shows how, according to one particular characteristic of the invention, the threads 2 of the male part 1 have a circumferential surface 2a representing a perceptible decrease in helix diameter, while threads 6 of female part 5 are spaced by a similar surface 6a, which allows for obtaining advantages which have been indicated above.

Of course, it is preferable for surfaces 2a and 6a not to come in contact with one another during the process of connecting the joint.

In one embodiment, the diameter of the threads of the male and female parts may decrease by stages.

Figure 5:
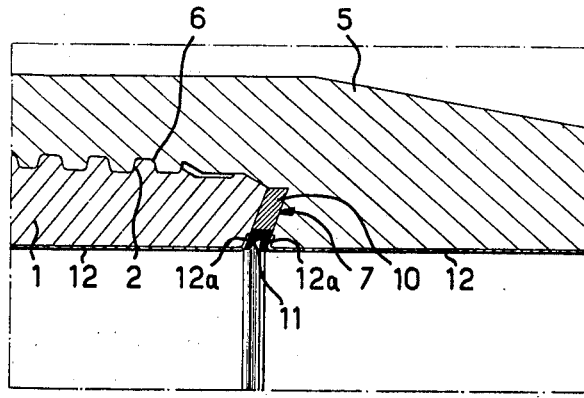
FIGS. 5, 6 and 7 show in section different embodiments of the arrangement according to FIG. 3.
Figure 6:
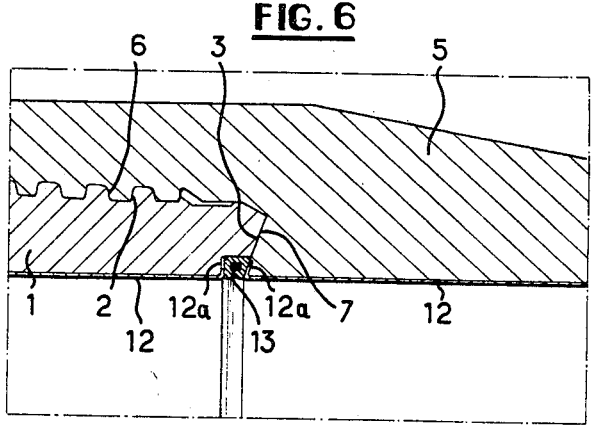
Figure 7:
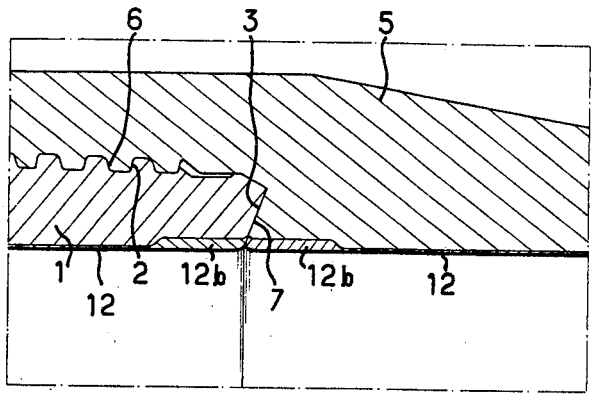

Female element 5 and its threads 6 as well as male element 1 and its threads 2 are shown on FIGS. 5, 6 and 7 which represent alternatives to the embodiment shown in FIG. 3.

In these embodiments are also found the characteristics of shoulder 7 of the joint according to the invention.

In the three embodiments shown in FIGS. 5, 6 and 7 additional means has been provided which increases still more the fluid-tightness of the joint according to the invention.

In the embodiment represented in FIG. 5, there is placed in a groove made on shoulder 7, a washer 10 of hard steel, which is preferably removable and at the inside of which is attached a plastic ring 11 forming a fluid-tight joint, which also has the advantage of protecting the enamelled surfaces 12a which might run the risk of damage during tightening.

The lips of ring 11 are applied against enamelled surfaces 12 which cover the inner wall of the elements of the pipe and which extend slightly toward the interior at 12a near the plane of the joint.

This protective enamel or coating which can be of a conventional type, is for example formed from epoxy resin.

It will be noticed that in this embodiment, the washer 10 performs the functions of surfaces 3 and 7 illustrated in FIG. 3 the elastic limits whereof have been increased by suitable treatments, whereas on the other hand ring 11 assures supplementary tightness.

In the embodiment according to FIG. 6, contact is effected, according to the invention, between the extremity 3 of male element 1 and the conic shoulder 7 of the female element, a sealing ring 13 being mounted in a groove on the inner edge of the male extremity. The layer of enamel 12 covering the inner surface of the pipe 1 is also, in this particular case, extended to 12a over the edges of ring 13.

In the embodiment shown in FIG. 7, the supplementary sealing is effected by placing a greater thickness of plastic coating 12b in the vicinity of shoulder 7 and surface 3, tightness being assured by elastic contact of the plastic enamel at the right of the joint.

It will be understood that the embodiments which have been described above are given only by way of example and are subject to desirable modifications without thereby departing from the framework of the invention.

In particular, it will be clear that the invention is not limited to the combination of all the characteristics which have been described with reference to the embodiments shown on the drawings.

The scope of the invention is not exceeded, either, by omitting the chamfer made on the outer edge of the male element or by omitting the concave tapered surface encircling the periphery of the convex conic shoulder according to the invention.

In fact, without utilizing these characteristics, sufficient tightness can be obtained by reason of plastic deformations of the metal during tightening.

It is also understood that the diameters of the threads on the male element and the female element may be modified as hereinbefore described without utilizing the other characteristics of the invention.

Finally, the invention may be applied to the joining of two male elements by means of a double female sleeve as well as to other joints presenting similar characteristics.

What is claimed is:

1. In a pipe joint comprising a metallic male member having a tapered, externally permanently threaded end portion and a metallic female member having a mating tapered internally permanently threaded portion lying between an open end and an internal shoulder against which the principal axial force exerted while the joint is being made up is applied, said shoulder being positioned sealingly abutting the end of said male member when said members are screwed together to form a fluid-tight joint, the improvement according to which the radially inner portion of said shoulder is defined by a frustoconical surface having its minimum diameter nearest said open end, and the radially outer portion of said shoulder is defined by a frusto-conical surface having its maximum diameter nearest said open end, the abutting end of said male portion being formed with a frusto-conical surface complementary to the inner frusto-conical surface on said shoulder, the threaded portion on said male member being axially spaced from the end of said male member by a thread-free portion, and the inner surface of said female member having a thread-free portion between the threads on said female member and said shoulder which encircles the thread-free portion on said male member when said joint is made up, the diameter of the thread-free portion of the inner surface of said female member being sufficiently greater than the diameter of the thread-free portion of said male member so that deformation of the radially outer edges of the end of said male member toward the thread-free surface of said female member occurs when said members are screwed tightly together and the end of said male member is forced against said shoulder.

2. A pipe joint as claimed in claim 1 in which a sealing ring is placed so that its inner surface is flush with the inner walls of said male and female members and said sealing ring abuts said shoulder.

3. A pipe joint as claimed in claim 2 in which the surfaces of said male and female members in contact with said sealing ring are covered by a protective coating.

4. A pipe joint as claimed in claim 1 in which the radially inner walls of said male and female members are covered by a protective coating which is thicker near said shoulder than elsewhere.

5. A pipe joint connection according to claim 1 wherein the shoulder of said female portion has been treated in a manner having the elastic limit increasing effect of cold hardening.

6. A pipe joint connection according to claim 1 wherein the surface of said abutting end of said threaded male portion is treated in a manner having the elastic limit increasing effect of cold hardening.

7. A pipe joint as claimed in claim 1 in which said abutting end of said male member is formed with a chamfer encircling the frusto-conical surface thereon and mating with the outer frusto-conical surface on said shoulder.

8. A pipe joint connection according to claim 1 wherein the generatrices of said inner frusto-conical surfaces form an angle of 10° to 30° with a plane perpendicular to the longitudinal axis of said joint.

9. A pipe joint connection according to claim 1 wherein the generatrices of said inner frusto-conical surfaces form an angle of 15° to 20° with a plane perpendicular to the longitudinal axis of said joint.

10. A pipe joint as claimed in claim 1 in which the length of said male member between its endmost thread and the end surface of said male member which abuts said shoulder is less than twice the radial thickness of said male member between said endmost thread and end surface.

11. A pipe joint as claimed in claim 1 in which the radially outer frusto-conical surface defining said shoulder is positioned to contact the end of said male member before the inner frusto-conical surface contacts said end as said members are being screwed together.

12. A pipe joint as claimed in claim 1 in which the height of the threads on the female member becomes gradually greater than that of the threads on the male member as they approach the shoulder on said female member.

References Cited

UNITED STATES PATENTS

| | | | |
|---|---|---|---|
| 597,000 | 1/1898 | Higbee | 285—333 |
| 2,793,059 | 5/1957 | Woodling | 285—382.4 X |
| 3,295,870 | 1/1967 | Seablom | 285—331 |
| 1,774,841 | 9/1930 | Parker | 285—333 X |
| 2,258,066 | 10/1941 | Oyen | 285—334 X |
| 2,261,566 | 11/1941 | Russell et al. | 285—355 X |
| 2,338,307 | 1/1944 | Staggers | 285—332.4 X |
| 2,772,899 | 12/1956 | Evans | 285—333 |
| 3,041,088 | 6/1962 | Brandon | 285—355 X |
| 3,107,421 | 10/1963 | Turnbull | 285—551 |
| 3,266,821 | 8/1966 | Safford | 285—332.2 X |

FOREIGN PATENTS

| | | |
|---|---|---|
| 1,300,262 | 6/1962 | France. |
| 392,827 | 5/1933 | Great Britain. |

DAVID J. WILLIAMOWSKY, Primary Examiner

D. W. AROLA, Assistant Examiner

U.S. Cl. X.R.

285—332.2, 334, 355